Aug. 9, 1960  E. A. NIX  2,948,412
APPARATUS FOR AUGMENTING HOIST BRAKE CAPACITY
Filed Nov. 15, 1956  4 Sheets-Sheet 1
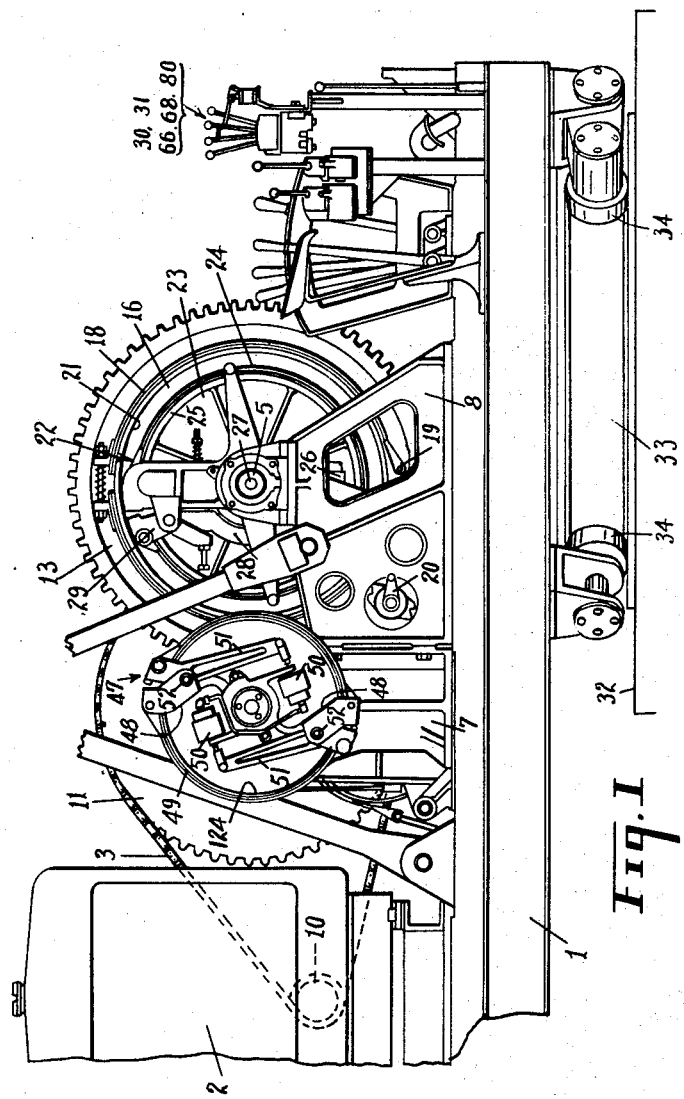
INVENTOR
E. A. Nix
By Fetherstonhaugh & Co.
Attorneys

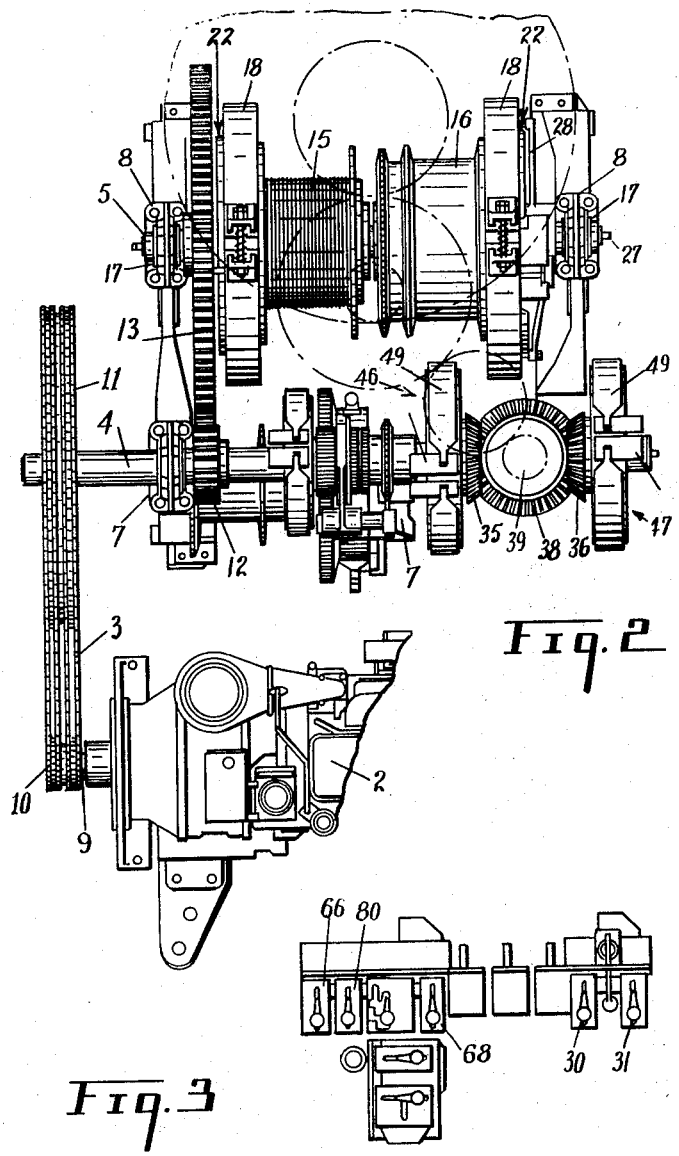

INVENTOR
E. A. Nix
By Fetherstonhaugh & Co.
Attorneys

Aug. 9, 1960 E. A. NIX 2,948,412
APPARATUS FOR AUGMENTING HOIST BRAKE CAPACITY
Filed Nov. 15, 1956 4 Sheets-Sheet 4

INVENTOR
E. A. Nix
By Fetherstonhaugh & Co.
Attorneys

United States Patent Office 2,948,412
Patented Aug. 9, 1960

2,948,412

APPARATUS FOR AUGMENTING HOIST BRAKE CAPACITY

Edmund Allen Nix, Valois, Montreal, Quebec, Canada, assignor to Dominion Engineering Works Limited, Montreal, Quebec, Canada Filed Nov. 15, 1956, Ser. No. 622,316

3 Claims. (Cl. 212—69)

This invention relates to a method of augmenting hoist brake capacity and particularly to improvements in control apparatus whereby precise lowering of heavy loads by portable cranes is achieved.

The invention consists essentially in utilizing additional brake capacity which already exists in the usual revolving type portable crane, the additional braking capacity residing in both the slewing clutches which, in this invention, are both engaged at one time and locked with the hoist shaft when it is desired to lower a capacity load by small amounts with precision for safer and more accurate handling of the load.

Lifting cranes of the portable crawler or rubber mounted type are normally provided with two main hoisting drums. Each drum rotates freely on the main drum shaft which is driven at a uniform governed speed by the crane power unit. The hoist drum can be connected to the rotating drum shaft by means of a friction clutch which, when engaged, causes the hoist drum to rotate and to wind in the hoist rope. Each hoist drum is equipped with a friction brake capable of holding the drum stationary against the full torque exerted by the loaded hoist rope.

The hoist brake must be capable of lowering the maximum rope load at controlled speed and of stopping the load at any point in the lowering cycle. For capacity loads which must be lowered small amounts with precision, the additional braking capacity obtained by utilizing both slewing clutches to assist the hoist brake, assures that the load will be lowered fractional amounts with complete safety and precision.

The object of the invention is to utilize additional braking capacity inherent in the hoisting apparatus by providing supplementary controls which will allow the additional braking capacity to be used without detracting from the normal operation of the mechanism having such additional braking capacity.

A further object of the invention is to provide a control mechanism which can readily be added to existing hoists to improve their operating efficiency.

A further object of the invention is to provide a control mechanism which will function by pneumatic, hydraulic or mechanical means with equal efficiency.

A further object of the invention is to provide means whereby maximum loads can be lowered fractional amounts with precision and with greater safety.

A further object of the invention is to provide a control mechanism which can be added to control additional braking capacity inherent in either travel control clutches or slewing control clutches of the hoisting apparatus.

These and other objects of the invention will be apparent from the following specification and the drawings forming a part thereof, of which:

Fig. 1 is a side elevation of the hoisting apparatus of a portable crane.

Fig. 2 is a plan view of the apparatus shown in Fig. 1.

Fig. 3 is a plan view of the hoist control panel showing the additional controls required for the operation of this invention.

Figure 4:
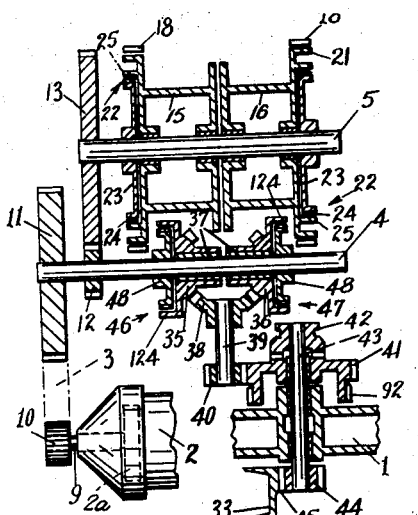
Fig. 4 is a sectional diagram of the hoisting apparatus shown in Figure 2 including slewing mechanism and control clutches supplying the additional braking capacity.

Referring to the drawings, only the hoisting, slewing and travelling mechanism is shown mounted on the rotatable deck of the machine. All reference to hoist booms, travel treads, buckets etc. have been eliminated as they do not concern the operation of the invention herein described.

The main hoist, slewing and travelling mechanism hereinafter described is typical of nearly all portable hoists and the invention lies in the application of additional control mechanism in a new manner whereby braking capacity inherent in the hoist mechanism but hitherto not used, can be utilized as added braking capacity to the load on the hoist.

The rotatable deck 1 of the hoist supports the power plant 2 from which power is transmitted through the drive chain 3 to the slewing shaft 4, the main hoist shaft 5 and the travel shaft 6. For convenience the travel mechanism drive is shown only in Fig. 5 in diagrammatic form to illustrate that it can be used in the same manner as the slewing drive as a source of additional braking capacity.

The slewing shaft 4 is supported in the brackets 7 from the deck 1 while the hoist shaft 5 is supported in the brackets 8, also from the deck 1.

The power plant 2 is connected by suitable clutch 2a means, with the output shaft 9. A spur gear or sprocket 10 is secured to the outer end of the shaft 9 and engages with the drive chain 3, to carry the drive to the gear wheel 11 and to the slewing shaft 4. A spur gear 12 on the slewing shaft 4 meshes with the gear wheel 13 on the hoist shaft 5. From the gear wheel 13 the drive is carried trough the spur gear 14 to the travel shaft 6. The three shafts 4, 5 and 6 are all geared together to rotate at a fixed rate with respect to each other and this feature has an important bearing on the application of additional braking capacity from either the shaft 4 or 6 or from both, to the hoist mechanism mounted on the hoist shaft 5 as later described.

The hoist mechanism mounted on the shaft 5 comprises two rope drums 15 and 16 which rotate freely on the shaft bearings 17. Each rope drum 15 and 16 is controlled by a brake band 18 which is anchored to the machinery deck 1 at 19 and is controlled by suitable power means acting through the arm 20 to engage and disengage the brake band 18 from the brake drum 21 which is an integral part of each of the hoist drums 15 and 16.

Each of the hoist drums 15 and 16 can be locked to the hoist shaft 5 by the clutches 22. These clutches 22 comprise a clutch spider 23 keyed to the shaft 5 on the outside of each of the drums 15 and 16 and are provided with friction bands 24 for engagement with concentric friction drums 25 which are integral with the drums 15 and 16. The engagement of the clutches 22 with the hoist drums 15 and 16 allows the drive from the power plant 2 applied through the shaft 5 to hoist the loaded rope on the drums 15 and 16.

The clutches 22 are energized from the cylinders 26 by hydraulic or pneumatic pressure fed through the center of the shaft 5 at 27 and thence to the cylinders 26. The lever 28 displaced by action in the cylinder 26 acts on the lever 29 to engage and disengage the friction bands 24 with the drums 25. The control of the clutches 22 is by means of the valves 30 and 31 located at the control panel of the hoist mechanism.

The revolving machinery deck 1 of the hoist or crane is mounted on the truck or carrier frame 32 by means of the turntable 33 having rollers 34 which allow rotation of the deck 1 through a full circle or through a multiple of circles. Rotation of the machinery deck 1 is effected by the reversing slewing mechanism driven by the shaft 4. The reversing mechanism consists of two bevel gears 35 and 36 which rotate freely on the bearings 37 on the shaft 4. Both bevel gears 35 and 36 mesh with the bevel gear 38 which is keyed to the vertical shaft 39. Power from the shaft 39 is transmitted through the gears 40 and 41 to the jaw clutch 42 which is splined to the top end of the shaft 43 which in turn is journalled in the rotating machinery deck 1. A gear 44 is keyed to the lower end of the shaft 43 and meshes with the turntable ring gear 45 to effect rotation of the machinery deck 1 on the turntable 33 in a clockwise or counter clockwise direction depending on which bevel gear 35 or 36 is locked with the shaft 4.

Slewing clutches 46 and 47 are mounted outside of the bevel gears 35 and 36 and comprise the spiders 48 keyed to the shaft 4 and provided with friction bands 49 to engage with the friction drums 124 which are secured to the bevel gears 35 and 36. The slewing clutches 46 and 47 are energized from the cylinders 50 through the levers 51 pivoted at 52 to the clutch spiders 48. The cylinders 50 are energized by either hydraulic or pneumatic pressure controlled by the valve 68 at the control panel of the hoist. Alternative engagement of the clutches 46 and 47 effects reverse rotation of the rotating machinery deck 1.

Figure 5:
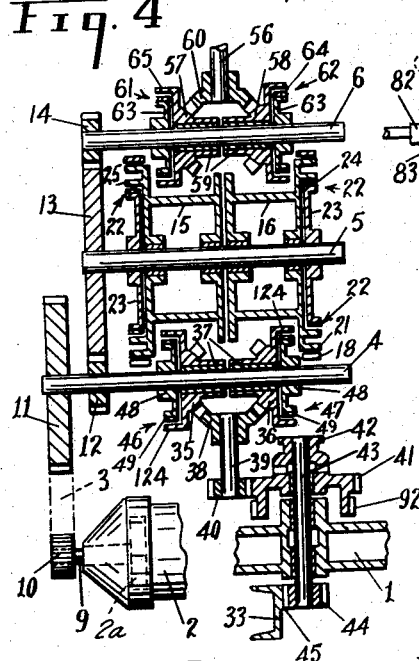
Fig. 5 is a sectional diagram similar to that shown in Fig. 4 but showing in addition travel mechanism from which the additional braking capacity can also be obtained.

The above described mechanism is shown in diagrammatic form in Fig. 4 of the drawings except that the control valves for the various clutches and the necessary piping have been omitted.

Where travelling gear is fitted, as shown in Fig. 5 the shaft 6 is driven by the pinion 14 from the hoist gear wheel 13 and the drive to the traveller rig, not shown, is through the shaft 56. The drive from the shaft 6 to the shaft 56 is through a reversing mechanism similar in every respect to that for effecting reversing drive from the shaft 5 to the revolving deck 1. The reversing mechanism consists of two bevel gears 57 and 58 which rotate freely on the bearings 59 on the shaft 6. Both bevel gears 57 and 58 mesh with the bevel gear 60 which is keyed to the vertical shaft 56. Directional driving clutches 61 and 62 are mounted outside of the bevel gears 57 and 58 and comprise the spiders 63 keyed to the shaft 6 and provided with the friction bands 64 to engage with the friction drums 65 which are secured to the bevel gears 57 and 58. The directional driving clutches 61 and 62 are energized from cylinders and levers similar to the cylinders 50 and levers 51 and are controlled by valve 80 at the control panel of the hoist.

In normal hoisting operations using the above described gear, the clutch 2a of the power plant 2 is engaged and the shafts 4 and 5 in the case illustrated in Fig. 4, or shafts 4, 5 and 6 in the case illustrated in Fig. 5, are caused to rotate at a constant speed with relation to each other. Hoisting is effected by energizing the hoist clutches 22 to lock the hoist drums 15 and/or 16 with the shaft 5. Hoisting is stopped by disengaging the clutches 22 and applying the brake bands 18 to the brake drums 21 to stop and hold the load suspended on the hoist ropes.

Using the augmented hoist brake capacity of the present invention, a hoist clutch 22 is left engaged while the load is held suspended by the application of brake bands 18 at the same time as the power plant clutch 2a is disengaged to stop running of the deck machinery.

Figure 6:
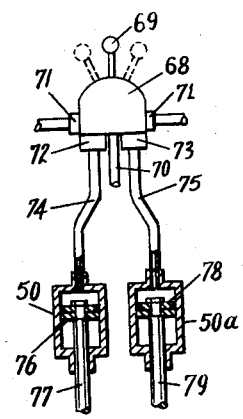
Fig. 6 is a diagrammatic representation of the control valve assembly for obtaining alternate control of the clutches of the slewing mechanism and of the travel mechanism.

In the normal operation of slewing the rotatable deck 1, the double valve 68 controls the engagement of one or other of the reversing slewing clutches 46 or 47. The clutch control mechanism is shown diagrammatically in Fig. 6 where the double valve 68 is operated by the valve handle 69. The valve 68 is provided with a fluid supply port 70, a pair of exhaust ports 71 and a pair of fluid delivery ports 72 and 73. A pipe 74 leads from the delivery port 72 to the cylinder 50 while a pipe 75 leads from the delivery port 73 to the cylinder 50a. When the operating handle 69 is moved to the left from the neutral or exhaust position, fluid under pressure is allowed to flow through the pipe 74 into the cylinder or cylinders 50 to effect displacement of the piston 76 and piston rod 77 and, through engagement with the operating lever 51 cause engagement of the reversing clutch 47. Similarly, when the operating handle 69 of the valve 68 is moved to the right, fluid under pressure is caused to flow through the pipe 75 to effect engagement of the reversing clutch 46. The valves 68 are preferably of the type in which fluid is delivered at a pressure proportionate to the angular movement of the lever 69. In Fig. 1 of the drawings a clutch mechanism 47 is shown employing two cylinders 50, in this case the pipe 74 would be branched to feed both cylinders. Similarly, the pipe 75 would be branched to feed the cylinders 50a for the clutch 46 on the opposite side of the reversing mechanism.

Figure 7:
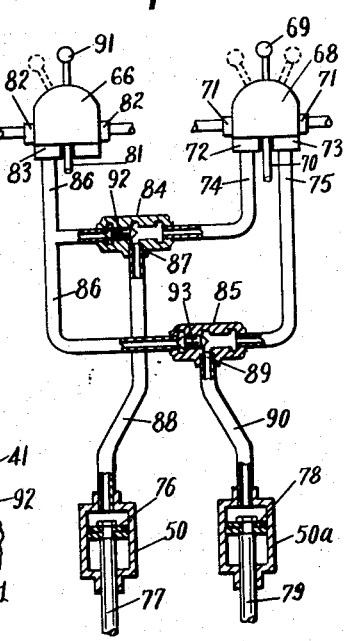
Fig. 7 is a diagrammatic representation similar to Fig. 6 but showing the additional control valve and check valves used to cause simultaneous engagement of both clutches of the slewing mechanism and of the travel mechanism.

In Fig. 7 of the drawings an additional control valve 66 is fitted into the control system in order to effect simultaneous engagement of both slewing clutches 46 and 47. The control valve 66 is a single valve unit having a fluid supply port 81, exhaust ports 82 and a fluid delivery port 83. In place of the pipe 74 and 75 being connected directly to the cylinders 50 and 50a as in Fig. 6, they are connected to one side of each of the check valves 84 and 85. The pipe 86 is branched to connect the delivery port 83 of the valve 66 with the opposite side of each check valve 85 and 84. The outlet 87 from the check valve 84 is connected with the cylinder 50 by means of the pipe 88 while the outlet 89 of the check valve 85 is connected with the cylinder 50a by the pipe 90. The operating handle 91 of the valve 66, when moved to the left from the neutral or exhaust position, allows fluid to pass into the pipe 86. This pressure causes valve seats 92 and 93 to move to block pipes 74 and 75 allowing pressure fluid to reach cylinders 50 and 50a through pipes 88 and 90 thus causing simultaneous engagement of both clutches 46 and 47.

For normal slewing engagement of clutches 46 and 47 valve 68 allows pressure fluid to flow through pipe 74 to check valve 84 and cylinder 50 when handle 69 is moved to the left. When handle 69 is moved to the right fluid flows to cylinder 50a through pipe 75 and check valve 85. When valve 68 is being used, valve 66 must be in neutral or exhaust position. When valve 66 is being used, valve 68 must be in neutral or exhaust position.

The control valves shown in Fig. 7 and described above can be installed to control the reversing clutches 61 and 62 of the travelling reverse gear if it is desired to make use of the braking capacity of these clutches in the same manner for added braking capacity.

In the operation of the invention, all the braking potential required to give precision control of the lowering of maximum loads, is present in the braking of the hoist drums 15 and 16 and in the slewing and driving mechanism of most portable hoist equipment, and it is only necessary to harness all of this braking capacity by means of suitable controls. This is achieved by substituting the control system shown in Fig. 7 for the present day controls shown in Fig. 6.

Normal hoisting and lowering of loads is carried out in the usual manner. Hoisting is effected by engaging the hoist friction clutches 22 to lock the hoist drums 15 and 16 to the shaft 5. For lowering light loads and relatively heavy loads which do not require precision lowering of fractional amounts, hoisting is stopped by disengaging the friction clutches 22 and applying the brake bands 18 to the brake drums 21 to control the lowering of the load.

For lowering loads, and particularly for lowering heavy loads precise fractional amounts, the friction clutches 22 locking the hoist drums 15 and 16 to the shaft 5 are left in engagement. The clutch 2a of the prime mover 2 is then disengaged to stop rotation of the deck machinery. The handle 69 of the control valve 68 is left in neutral exhaust position and the handle 91 of the control valve 66 is moved to the left to allow pressure fluid to flow into the pipe 86. This has the effect of moving both the valve beats 92 and 93 of the check valves 84 and 85 into a position blocking the inlets from the pipes 74 and 75 and allowing the pressure fluid to flow from the valve 66 through the pipes 88 and 90 into the cylinders 50 and 50a to effect engagement of both slewing friction clutches 46 and 47. Engagement of both the slewing friction clutches 46 and 47 locks the bevel reversing gears 35, 36 and 38 and the capacity of both clutches 46 and 47 is added as additional torque resistance to the hoist drum shaft 5 through the gears 12 and 13.

When both slewing clutches 46 and 47 are engaged the torque reaction from each clutch is taken by diametrically opposite teeth on the bevel gear 38. Since the reaction from each clutch is in the same direction, the bevel gear 38 will remain stationary.

Controlled lowering of the load can be effected through the brake bands 18 or through the slewing clutches 46 and 47 or by a combination of both brake bands and slewing clutches. Similarly, if the clutches 61 and 62 of the traveling mechanism are controlled by valve 66 they can be used instead of the slewing clutches 46 and 47 to augment the brake capacity in the same manner.

The above description covers the use of slewing or travelling mechanism clutches controlled by either hydraulic or pneumatic pressure. A similar arrangement controlled by mechanical means is shown in Fig. 8 and will be described as being applied to the slewing clutches 46 and 47.

Figure 8:
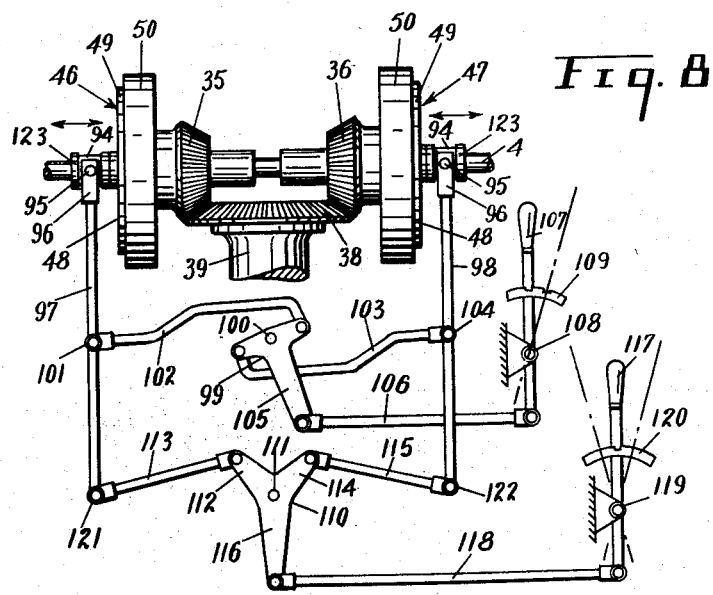
Fig. 8 is schematic layout of a mechanical adaptation of the control of the slewing clutches for the purpose of adding their braking capacity to the hoist brakes.

In Fig. 8 the mechanism is shown in a neutral position in which the clutches 46 and 47 are not engaged but can be moved into engagement or further out of engagement. The clutch spiders 48 are splined on the shaft 4 and are provided with friction bands 49 for engagement with the friction drums 50 which are secured to the bevel gears 35 and 36. The bevel gears 35 and 36 together with their friction drums 50 rotate freely on the shaft 4 when not engaged by the clutches 46 and 47. The spiders 48 are provided with extension hubs 123 grooved at 94 to receive the shifter collar carrying the pins 95 of the clevises 96 on the upper end of the levers 97 and 98. The T-shaped crank 99 is pivoted on the fixed fulcrum 100. The short arm of the T crank 99 is connected at one end with the lever 97 midway of its length at the point 101 by the link 102 while the link 103 connects the other end of the short arm of the T crank 99 with the lever 98 midway of its length at the point 104. The end of the long arm 105 of the T crank 99 is connected by the link 106 to the bottom end of the hand lever 107 which is pivoted at 108 and moves in the segment 109. The Y crank 110 is pivoted on the fixed fulcrum 111. The arm 112 of the crank 110 is connected with the lower end of the lever 97 by means of the link 113 while the arm 114 of the crank is connected with the bottom end of the lever 98 by the link 115. The arm 116 of the crank 110 is connected with the bottom end of the hand lever 117 by the link 118. The hand lever 114 being pivoted at 119 and moving in the segment 120.

In the operation of the mechanism shown in Fig. 8 and described above, the hand lever 117 performs the same duty as does the valve 68 while the hand lever 107 does the same duty as the valve 66.

When the mechanism is to be operated for slewing control only, both clutches 46 and 47 are disengaged when both hand levers 107 and 114 are in the neutral position as shown in Fig. 8.

*To engage clutch 46.*—The hand lever 117 is moved in an anticlockwise direction about its pivot 119 which causes rotation of the crank 110 also in an anti-clockwise direction. As the linkage connected with the hand lever 107 is held stationary in the neutral position the points 101 and 104 become pivot points about which the levers 97 and 98 swing. As the crank 110 rotates in an anticlockwise direction the levers 97 and 98 are caused to rotate in a clockwise direction causing engagement of the clutch 46 and further disengagement of the clutch 47.

*To engage clutch 47.*—The hand lever 117 is first moved into the neutral position effecting disengagement of clutch 46 and bringing clutch 47 nearer to engagement. The hand lever 117 is then moved in a clockwise direction about its pivot 119 causing the crank 110 to rotate in a clockwise direction and effecting rotation of the levers 97 and 98 in an anticlockwise direction, causing engagement of the clutch 47 and further disengagement of the clutch 46.

*To utilize both clutches 46 and 47 as additional brake capacity.*—The hand lever 117 is held in the neutral position with both clutches 46 and 47 disengaged. Movement of the hand lever 107 in a clockwise direction about its pivot 108 causes the crank 99 to rotate on its fulcrum 100 in a clockwise direction and effecting a pull on the links 102 and 103. As the crank 110 is held stationary the joint between the link 113 and the bottom of the lever 97 becomes a pivot point 121 and the joint between the link 115 and the bottom of the lever 98 becames a pivot point 122. The pull on the links 102 and 103 causes the levers 97 and 98 to be rotated inwards on their pivots 121 and 122 and thereby effecting engagement of both clutches 46 and 47 to lock the bevel gears 35, 36 and 38 with the shaft 4.

From the above description it will be seen that, while braking has been effected directly at the hoist drums, such braking capacity may or may not be sufficient for the effective control of maximum loads when such loads have to be lowered fractional amounts. The condition of the brakes at the hoisting drums after wear may have the effect of reducing the efficiency of these brakes to the extent that fractional lowering of maximum loads become increasingly difficult. By the addition of the simple control above described, it is now possible to utilize considerable additional braking capacity inherent in the hoist mechanism but not hitherto usable. In addition, the very fact that such additional braking capacity can be used for load lowering purposes has the effect of locking the slewing mechanism solidly with the whole deck machinery and thereby adding greatly to the stability of the hoist when maximum loads have to be lowered fractional amounts with great precision.

What I claim is:

1. In a portable hoist having a primary drive unit, a hoisting drum and a reversing mechanism driven from an output shaft connected with the primary drive unit, in which clutches tie the hoisting drum and reversing mechanism to the output shaft for individual drive and a hoist brake associated with the hoisting drum controls the braking of the load imposed on the hoist drum, a pair of cylinder and piston devices associated with the clutches for said reversing mechanism, a source of fluid under pressure and control means for said reversing clutches comprising a control valve having inlet and exhaust ports and a pair of feed ports, a second control valve having inlet and exhaust ports and a single feed port, a pair of check valves, one side of each check valve being connected to the one of the pair of feed ports of the first mentioned control valve and the other side of each check valve being connected by a common connection to the single feed port of the second mentioned control valve and a centrally positioned outlet from each of said check valves one of which leads to one of said pair of cylinder and piston devices while the other leads to the second of said pair of cylinder and piston devices, said first mentioned control valve effecting alternative engagement of said reversing clutches through said pair of cylinder and piston devices and said second control valve effecting blockage of the feed lines from said first mentioned control valve through said check valves and simultaneously connecting said cylinder and piston devices to said source of fluid under pressure to effect simultaneous engagement of said reversing clutches to said reversing mechanisms to lock the reversing mechanisms with the output shaft, the clutches of said reversing mechanism providing added braking capacity applied through the output shaft to the said hoisting drum for greater braking control of the load of the hoist drum when the output shaft is disconnected from the primary drive unit.

2. A control mechanism for the imposition of added braking capacity to portable hoists comprising, a pair of clutch operating cylinder and piston devices, a source of fluid under pressure, a control valve having an inlet port connected with said source of fluid under pressure and having an exhaust port and a pair of feed ports, a second control valve having an inlet port connected with said source of fluid under pressure and having an exhaust port and a single feed port, a pair of check valves, one side of each check valve being connected to one of the pair of feed ports of the first mentioned control valve and the other side of each check valve being connected by a common connection to the single feed port of the second mentioned control valve, and a centrally positioned outlet from each of said check valves, one of which leads to one of said pair of cylinder and piston devices while the other leads to the second of said pair of cylinder and piston devices, said first mentioned control valve effecting alternative operation of said pair of cylinder and piston devices and said second control valve effecting blockage of the feed lines from the first mentioned control valve through said check valves and simultaneously operating both of said cylinder and piston devices when said first mentioned control valve is kept in a neutral position.

3. A portable hoist having a deck rotatably supported from the carrier frame and hoist means mounted on said deck, said hoist means including, power means including a power shaft, a first shaft, means interconnecting said first shaft and said power shaft for rotating said first shaft by said power means, a second shaft, gear means interconnecting said first and second shafts for rotating said second shaft by rotation of said first shaft, a hoisting drum freely rotatable on said second shaft, clutch means mounted on said second shaft for rotating the drum with the shaft, brake means cooperating with said drum for retaining the drum in a predetermined position, slewing means including a pair of bevel gears freely rotatable on said first shaft, an output shaft and a bevel gear on said output shaft, a ring gear fixed on the carrier frame and a gear on said output shaft in engagement with the ring gear, a pair of clutch means operatively connected with said pair of bevel gears and alternatively engageable for rotating the output shaft to rotate the deck in opposite directions with respect to the carrier frame, a drive clutch means mounted on said power shaft, and means for simultaneously engaging said pair of clutch means to lock said first and second shafts together to prevent rotation of said hoisting drum when said drive clutch means is disengaged and when the hoist drum clutch is engaged.

References Cited in the file of this patent

UNITED STATES PATENTS

| | | |
|---|---|---|
| 1,759,647 | Kincannon | May 20, 1930 |
| 1,808,898 | Kerr | June 9, 1931 |
| 1,959,533 | Iverson | May 22, 1934 |
| 2,265,260 | Argo | Dec. 9, 1941 |
| 2,266,651 | McLean | Dec. 16, 1941 |
| 2,503,891 | Van Voorhis | Apr. 11, 1950 |

FOREIGN PATENTS

| | | |
|---|---|---|
| 7,539 | Great Britain | Apr. 16, 1894 |